United States Patent Office 3,778,365

Patented Dec. 11, 1973

3,778,365

HYDROCRACKING AND HYDRODENITROGENATION OF SHALE OIL

Glen P. Hamner, Baton Rouge, and Ralph B. Mason, Denham Springs, La., assignors to Esso Research and Engineering Company No Drawing. Continuation-in-part of abandoned application Ser. No. 735,546, June 10, 1968. This application July 27, 1970, Ser. No. 58,646

Int. Cl. B01j *11/40;* C01b *33/28;* C10g *13/02*

U.S. Cl. 208—111 26 Claims

ABSTRACT OF THE DISCLOSURE

A process, and nitrogen-bearing bimetallic catalyst, for upgrading heavy hydrocarbon oils by means of catalytic hydrocracking and hydrodenitrogenation. Heavy hydrocarbon oils containing appreciable quantities of nitrogen, particularly shale oils, are subjected to catalytic hydrocracking in the presence of hydrogen and a catalyst, prepared by ammonia activation of a catalyst composite comprising a mixture of nonnoble metals deposited on a suitable cracking base, particularly a crystalline zeolite base. Nitrogen is removed while the oil is selectively converted to lower boiling valuable products.

This is a continuation-in-part of U.S. application Ser. No. 735,546 filed June 10, 1968, now abandoned.

Hydrocracking processes are of considerable interest within the petroleum industry because of certain particularized advantages offered over conventional catalytic cracking operations. Hydrocracking is effected in the presence of added hydrogen and a suitable bifunctional catalyst capable of simultaneously cracking high-boiling hydrocarbons to lower-boiling fractions and hydrogenating olefinic and aromatic materials into saturated paraffins and naphthenes. Such bifunctional catalysts thus conventionally comprise a cracking base upon which a suitable hydrogenation component, usually a metal, is disposed.

Generally, hydrocracking finds its highest degree of utility in the conversion of hydrocarbons boiling in the heavy naphtha and light gas oil range. Use of the process has met with limited acceptance, however, in the upgrading of heavy hydrocarbon oils, particularly those containing high-boiling components having substantial sulfur and nitrogen content, particularly the latter, such as total crude oil, topped crudes and residua, shale oil, coal tars, etc. The various sulfur and nitrogen compounds present in such oils tend to poison the hydrocracking catalyst and deposit coke during the hydrocracking operation. It is known, for example, that the higher-boiling petroleum fractions of such oils, e.g., fractions boiling above about 750° F., and particularly above about 850° F., contain relatively high proportions of these objectionable contaminating materials. Accordingly, conventional hydrocracking of such fractions or oil feeds containing same has proved to be of very limited effectiveness.

The early hydrocracking processes utilized various metal hydrogenation components composited on amorphous metal oxide cracking bases. These amorphous based catalysts suffered from several disadvantages, including relatively low activity and extreme sensitivity to catalyst poisons such as nitrogen compounds present in the feed.

Recently, large advances have been made in the hydrocracking of hydrocarbons primarily due to the development of second generation catalysts which exhibit higher activity, improved selectivity, and a higher degree of resistance to catalyst poisons. It has thus been discovered and is known in the art, as disclosed in U.S. 3,269,934, to R. C. Hansford, for example, that a hydrocracking catalyst formed by adding a minor proportion, e.g., 0.1–20%, of one or more of the Group VI–B and/or Group VIII metals, preferably a Group VIII noble metal, particularly platinum, on large pore (e.g., 6 to 15 A. pore size) hydrogen form of crystalline aluminosilicate zeolite type catalyst is substantially more tolerant to the presence of nitrogen in the hydrocracking process than the previous amorphous-based materials. This has sometimes enabled the refiner to operate the preliminary hydrofining stage at more moderate conditions, thus reducing or even eliminating the generally undesirable cracking of the feed in the hydrofiner. Regardless of this improvement, the necessity for preliminary hydrofining is still present in the case of the extremely high nitrogen feeds.

Even the now conventional zeolite based catalysts thus leave much to be desired in the treatment of heavy, high nitrogen feeds. For example, the noble metal on large pore molecular sieve catalysts, e.g., palladium on synthetic faujasite base catalyst as described in U.S. 3,269,934, while substantially more nitrogen-tolerant than the previously used catalysts, nevertheless usually become deactivated when treating a feed containing much more than about 50 p.p.m. nitrogen. Thus, when these catalysts are applied to the processing of high nitrogen feeds such as shale oil, which contains nitrogen on the order of at least about several thousand parts, per million parts of oil, or higher, the catalyst is rapidly deactivated with correspondingly short catalyst life, necessitating frequent regeneration and/or replacement of catalyst. Moreover, in order to reduce the nitrogen level to an acceptable value, it is commonly experienced that the feed is cracked excessively to undesirable lower boiling products such as gaseous $C_3$ and $C_4$ products. It thus proves extremely difficult to achieve the requisite level of nitrogen reduction while at the same time achieving the desired selectivity to desired final products.

Even in the case where a preliminary hydrofining stage is employed to assist in the reduction of nitrogen of these heavy feeds to the acceptable levels (e.g., 20 to 50 p.p.m.), excessive cracking and hydrocracking have been found to occur in the hydrofiner, since the catalyst commonly employed (e.g., Group VI and VIII metals on amorphous alumina base) usually exhibit considerable cracking properties under the severe conditions necessary to achieve the desired nitrogen reduction.

It will be appreciated, therefore, that there is presently a high incentive for discovering a successful means for hydrocracking these heavy hydrocarbon feeds containing high-boiling nitrogen-containing petroleum fractions to valuable low-boiling products of commercially acceptable quality. It is, accordingly, the purpose of the present invention to provide such an improved process for hydrocracking these feeds, which process involves the use of a recently-discovered improved form of mixed nonnoble metal hydrocracking catalyst which is activated with ammonia (and/or precursor compounds that yield ammonia under the process conditions employed) so as to exhibit unusual superior hydrocracking properties when used in conjunction with the aforedescribed feedstocks.

The activating effect of ammonia on the mixed nonnoble metal catalysts used in the present invention is particularly surprising in view of the prior art experience with the poisoning effect of ammonia and like compounds on the catalytic activity of hydrogenation components. For example, U.S. Pat. No. 3,269,934, supra, on the one hand, describes the poisoning effect of nitrogen on a catalyst utilizing, e.g., Group VIII noble metal such as palladium, increased temperatures being required to at least partially overcome the poisoning effect of the organic nitrogen. U.S. Pat. No. 3,213,013, on the other hand, describes a regulated hydrocracking process using a platinum group metal on crystalline zeolite catalyst to obtain a constant octane gasoline product and teaches the use of a selected reversible catalyst poison to dampen the initial high activity of the catalyst in the early stages of hydrocracking, this catalyst poison normally being a nitrogenous base metal such as ammonia.

It is thus observed that, e.g., in the case of noble metal-zeolite catalyst, ammonia and ammonia precursors are known catalyst poisons and have, in fact, been used for the express purpose of regulating and dampening catalytic activity. The present invention is based on a discovery that appears contrary to the behavior of the abovementioned catalysts, and it has been found that treatment with ammonia actually has a substantial beneficial effect upon the catalytic activity of mixed nonnoble metal type catalysts, particularly for the purposes herein described; namely, the denitrogenation and selective conversion to desired products of these high-boiling, high nitrogen content, heavy feedstocks such as shale oil and the like.

A particularly surprising aspect of the present invention is that the catalyst used herein need not, and cannot, be sulfided or sulfactivated in order to promote catalytic activity, as has been widely disclosed in the art. Sulfiding of the catalyst proves detrimental. The catalysts used herein, however, have the peculiar property of removing nitrogen in the hydrocracking operation without appreciably affecting the sulfur content, and the sulfur content will not adversely affect the catalyst provided there is a greater partial pressure of nitrogen, as ammonia, than of hydrogen sulfide, the latter being produced in situ from the sulfur within the reaction mixture. The hydrocracking and hydrodenitrogenation process of the present invention can thus be extensively conducted in the absence of appreciable hydrogen sulfide partial pressure or in the presence of appreciable hydrogen sulfide partial pressure providing that ammonia partial pressure is greater than hydrogen sulfide partial pressure.

The present invention is based on the unexpected discovery that mixed nonnoble metal catalyst, preferably on a crystalline alumina-silicate zeolite base, exhibits superior hydrodenitrogenation and hydrocracking activity with heavy, high-nitrogen feedstock as hereinafter defined when activated with ammonia or ammonia precursor compounds. The present process can therefore be described as a combination hydrocracking-hydrodenitrogenation technique for the upgrading of these high nitrogen heavy feedstocks such as shale oil with an ammonia-activated mixed nonnoble metal catalyst, preferably of the crystalline alumino-silicate variety, and most preferably of the synthetic faujasite variety. The ammonia activation herein described can be accomplished either with gaseous ammonia or with ammonia-hydrogen mixtures in sufficient amount as to provide a catalyst having hydrocracking and denitrogenation activity such as is capable of substantially reducing nitrogen contents of typical feeds, e.g., from representative levels of about 500 p.p.m. down to about 25 p.p.m., and 25,000 p.p.m. down to 10,000 p.p.m. The catalyst of this invention are particularly useful in the treatment of feeds containing nitrogen in concentration of 2500 p.p.m., and higher, which feeds cannot be processed with conventional catalysts without extreme loss in catalytic activity and activity maintenance. Even feeds containing nitrogen in concentration ranging from about 5000 p.p.m. to about 25,000 p.p.m. can be processed according to this invention without significant loss in catalytic activity and activity maintenance.

Surprisingly, it has been found that a catalyst, prepared by activation of a composite which includes a crystalline zeolite base containing a mixture of nonnoble metal hydrogenation components, can be post treated with ammonia, or precursor thereof, at critical temperatures ranging from about 400° F. to about 800° F., and preferably from about 600° F. to about 750° F. (which or the optimum process conditions to be used), such that it will exhibit superior hydrocracking properties when used in treating high nitrogen feedstocks. The post treatment of such bimetallic catalyst composite with ammonia is believed to form a type of metal ammonia complex or, in any regard, does contain considerable nitrogen. The final catalyst, which can be prepared in situ or ex situ, when thus ammoniated, contains at least about 1.5 percent nitrogen, and higher, calculated as ammonia, based on the weight of the total composite, and preferably contains from about 2.5 to about 10.0 percent nitrogen, calculated as ammonia.

The reason for the effectiveness of such catalysts for use in hydrocracking high nitrogen hydrocarbon feeds is not understood, though it is believed that the metal ammonia-zeolite complex forms active catalytic sites that are effective for hydrocracking organic nitrogen-containing feeds. This is sharply contrasted with prior art catalysts where nitrogen compounds have been recognized as poisons for conventional hydrocracking catalysts. In any regard, post treatment of such bimetallic composite with ammonia is entirely different from, and the specimen formed is not the same as, an exchange wherein the ammonium ion is introduced into the zeolite and subsequently converted by calcination to the hydrogen form of zeolite. Even ammonia treatment of such zeolite, with subsequent addition of a metal hydrogenation component is not the same, and these modes of operation, or the catalyst produced, form no part of the present invention.

The mixed nonnoble metal catalyst can be ammoniated in the presence of sulfur, provided that the partial pressure of the ammonia is at least about 1.5 times as great as the partial pressure of the generated hydrogen sulfide. Further, to maintain the hydrocracking and hydrodenitrogenation activity, even after initial ammonia activation of the mixed nonnoble metal catalyst, the partial pressure of the ammonia within the reaction mixture must be maintained at least about 1.5 times as great as the partial pressure of the hydrogen sulfide produced in the reaction. Preferably, in catalyst preparation and in normal operation, the partial pressure of ammonia is maintained at least as high as from about 1.5:1 to about 100:1, relative to the partial pressure of hydrogen sulfide, where hydrogen sulfide is present in the system.

The most preferred form of the catalyst utilized in the practice of the present invention is an ammonia-activated zinc or nickel tungstate faujasite catalyst, faujasite being a natural or synthetic material of the molecular sieve type and preferably having a silica-to-alumina mole ratio greater than about 3. In its most preferred form, the mixed nonnoble metals are deposited on a hydrogen form of zeolite base, with unit cell size ranging below about 24.5 A., and preferably from about 24.4 A. to about 24.45 A. In preparation of such catalyst, the alkali or alkaline earth metal form of the zeolite, e.g., sodium zeolite, is first modified by cation exchange with hydrogen or a hydrogen precursor such as ammonium ions, which can be converted into hydrogen, by conventional sieve calcination procedures. The ammonium or hydrogen form of zeolite is then contacted with steam at from about 1000° F. to about 1300° F., or higher, for a period ranging from about 0.5 to about 4 hours. Steam at a temperature of about 1100° F., contacted with the base for a period of one hour has been found highly satisfactory. The mixture of nonnoble metals is then added to the steamed base, of reduced unit cell size, and the composite then ammoniated at conditions normally employed in the processing of hydrocarbon feeds.

The use of the unique catalyst hereinafter described together with the claimed ammonia activation technique results in a process for upgrading these difficult feedstocks in a single or multiple reactor sequence to accomplish desired denitrogenation, partial desulfurization, and hydrocracking functions. This obviously results in a substantial investment saving and lower operating costs. Furthermore, the products exhibit the desired distribution of naphtha products, thus eliminating the problem of undesired precracking in conventional hydrofining pretreatment zones.

The hydrocarbon oil feeds contemplated for use in the process of the invention include total crude oils, topped crude oils, visbroken petroleum residua, vacuum gas oils, shale oil, coal tars, tar sands, etc. Such feeds can be characterized by their relatively high total nitrogen content, their high-boiling constituents, and particularly by the high nitrogen contents of the high boiling fractions contained therein. Specifically, such hydrocarbon oil feeds will usually contain between about 500 and about 25,000 p.p.m. total nitrogen. At least about 70 volume percent of these oils, e.g., 70 to 90 volume percent, will comprise petroleum fractions having initial boiling points of at least 400° F., preferably at least 450° F. Preferably, at least about 50 to 80 volume percent of the feeds will comprise fractions initially boiling at least about 650° F., preferably at least about 800° F. These high boiling fractions (in both instances) will uusally contain at least about 1000 p.p.m., and generally at least about 2500 p.p.m., e.g., 2500 to 25,000 p.p.m., nitrogen. Among the feeds most preferably utilized are heavy gas oils, residua, and shale oil containing up to 25,000 p.p.m. total nitrogen and above, e.g., 2500 to 20,000 p.p.m. nitrogen, and containing about 70 to 90 volume percent of petroleum fractions boiling above 400° F., these fractions containing at least about 2500 p.p.m. nitrogen; more specifically 50 to 80 volume percent of petroleum fractions boiling above 650° F., such fractions containing at least about 2500 p.p.m. nitrogen; and still more specifically 10 to 50 volume percent of petroleum fractions boiling above 1000° F., such fractions containing at least about 3000 p.p.m. nitrogen. A typical shale oil feed will have a total nitrogen content within the range of 15,000 to 25,000 p.p.m. nitrogen. These heavy oils may also be characterized by their specific gravities, sulfur contents, Conradson carbon residues, asphaltene content, etc. These latter specifications, however, will vary so widely that it will be most meaningful to utilize the foregoing descriptions as to the nitrogen content and boiling range of the difficult-to-convert fractions. By way of illustration, however, typical heavy feeds herein contemplated, e.g., shale oil and the like, will have specific gravities of about 5° to 40° API, preferably 10° to 25° API; asphaltene contents of about 2 to 20, preferably 5 to 15; sulfur contents of 0.1 to 5 weight percent, preferably 0.2 to 1 weight percent; and Conradson carbon residues of 2 to 20 weight percent, preferably 5 to 15 weight percent.

The hydrocracking and hydrodenitrogenation process of the present invention can be accomplished in fixed bed, single reactor fashion, without the need for a preliminary hydrofining step. It will be appreciated, of course, that in certain instances it may nevertheless be desired to conduct preliminary hydrofining to remove a major portion of the sulfur and possibly some nitrogen impurities prior to contacting the feed with the catalyst. However, the advantages of the present invention will best be realized by elimination of the preliminary conventional hydrofining treatment which is possible through the use of the unique activated mixed nonnoble metal zeolite catalyst of the invention. Additionally, the present process can, of course, be accomplished by various processing techniques and, while a single reactor technique is preferred, dual and multiple stage flow plans can be utilized without intermediate distillation and with and without intermediate top and bottoms recycle to the various stages, depending upon the particular results and products desired. Such conventional techniques will not be described herein as they will be quite evident to those skilled in the art.

The reaction conditions employed in the practice of the present invention are summarized in the following table:

TYPICAL REACTION CONDITIONS

| | General range | Preferred range | Most preferred range |
|---|---|---|---|
| Temperature, ° F. | 600 900 | 750–850 | 775–825 |
| Pressure, p.s.i.g. | 500–3,000 | 1,500–3,000 | 2,000–2,500 |
| Feed rate, v./v./hr. | 0.5–5.0 | 1–2 | 0.5–1.0 |
| $H_2$ rate, s.c.f./bbl. | 2,000–20,000 | 4,000–15,000 | 8,000–12,000 |

The above reaction conditions will be best utilized with a preferred shale oil feed having a nitrogen content of about 5000 to 25,000 p.p.m. nitrogen. With heavier or lighter feeds, of course, the typical reaction conditions just set forth will be modified accordingly.

In addition to the above reaction conditions, it is specifically preferred to limit the extent of conversion of the feed to lower-boiling undesired products, such as $C_3^-$ gaseous products. While the ammonia-activated catalysts used in the present invention will usually achieve a satisfactory distribution of products owing to the unique selectivity of the catalyst, it will be sometimes necessary to adjust the reaction conditions so as to achieve the desired selectivity of product, and this will, of course, depend upon the particular characteristics of the feedstock being treated. In any case, it will usually be sufficient to obtain an overall degree of conversion of the feed to lower-boiling products of about 20 to 100, preferably 50 to 80, volume percent with a concurrent reduction in nitrogen content of about 40 to 95, preferably 70 to 80 percent. At the same time it is specifically preferred that the conversion of the feed $C_3^-$ product be limited to less than about 10 weight percent, and most preferably less than about 5 weight percent, e.g., 0 to less than about 3 weight percent. These conversion limitations will, of course, determine to some degree the operating conditions to be utilized, but the latter will be readily determined by the skilled refiner, taking into account the characteristics of feed and desired product distribution.

The catalysts utilized in the practice of the present invention are generally described as bifunctional catalysts comprising a mixed nonnoble metal hydrogenation component and a crystalline aluminosilicate zeolite cracking component such as has been conventionally used in hydrocracking. It is preferred that the crystalline aluminosilicate zeolite support have a silica-to-alumina mole ratio greater than 3. The zeolite support may be used as normally prepared, but is preferably exchanged with ammonium cations, and then steamed prior to incorporation of the metal constituents and subsequent ammonia activation.

The crystalline aluminosilicate zeolite catalyst support materials of the invention are well known. They are characterized by their highly ordered crystalline structure and uniformly dimensioned pores and are distinguishable from each other on the basis of composition, crystal structure, adsorption properties, and the like. The term "molecular sieve" is derived from the ability of these zeolite materials to selectively adsorb molecules on the basis of their size and form. The various types of molecular sieves may be classified according to the size of molecules which will be rejected (i.e., not adsorbed) by a particular sieve. A number of these zeolite materials are described, for example, in U.S. Patents 3,013,982–86 wherein they are characterized by their composition and X-ray diffraction characteristics. In addition to their extensive use as adsorbents for hydrocarbon separation processes and the like, it has recently been found that crystalline aluminosilicate zeolites, particularly after cation exchange to reduce alkali metal oxide content, are valuable catalytic materials for various processes, particularly hydrocarbon conversion processes.

In general, the chemical formula of anhydrous crystalline aluminosilicate zeolites expressed in terms of moles may be generally represented as:

$$0.9 \pm 0.2 \frac{M_2O}{n} : Al_2O_3 : X\ SiO_2$$

wherein M is a metal cation; $n$ is its valence; and X is a number from about 1.5 to about 14, said value being dependent upon the particular type of zeolite. The zeolite as synthetically produced or as found naturally normally contains an alkali metal, such as sodium or potassium, or an alkaline earth metal, such as calcium. Among the well-known natural zeolites are mordenite, faujasite, chabazite, gmelinite, analcite, erionite, etc. Such zeolites differ in structure, composition, and particularly in the ratio of silica to alumina contained in the crystal lattice structure. Similarly, the various types of synthetic crystalline zeolites, e.g., synthetic faujasite, mordenite, etc., will also have varying silica-to-alumina ratios, depending upon such variables as composition of the crystallization mixture, reaction conditions, etc.

For use in the present process the preferred zeolites will be those having uniform pore openings of about 6 to 15 angstrom units and the higher silica-to-alumina ratio. Therefore, whereas the present invention contemplates the use of zeolites in general, those having silica-to-alumina mole ratios above about 3 will be especially preferred. Typical among these is the synthetic faujasite variety, wherein X in the above formula is about 3 to 7, preferably 3 to 6, most preferably 4 to 5.5 (sometimes referred to as "Zeolite Y") and the synthetic mordenite variety, wherein X is about 8 to 12, preferably 9.5 to 10.5. It is also within the scope of the present invention to utilize crystalline aluminosilicate zeolites having the crystal structure of a conventional type zeolite, such as faujasite, mordenite, as examples, but which have been treated by steam, acid, complexing agents or combinations thereof so as to effectively increase the silica-to-alumina mole ratio by selective removal of alumina. Thus, faujasite type zeolites having silica-to-alumina mole ratios as high as 20 or even higher, and mordenite type zeolites having silica-to-alumina mole ratios of 100 or even higher, are eminently suitable for use in the practice of the present invention.

In order to be placed in a preferred form useful in the practice of the process of the present invention, the sodium form of the zeolite is preferably modified by cation exchange with hydrogen ion or an iron convertible into hydrogen ion, such as ammonium ion, by exchange procedures now well known in the art. It is generally desirable to replace a sufficient amount of the original alkali or alkaline earth metal cation, e.g., the sodium ion, so that the exchanged zeolite composition has a metal content, e.g., sodium content expressed as $Na_2O$, of less than 1.8 weight percent, preferably less than 1.3 weight percent.

The mixed nonnoble metal catalyst utilized in the practice of the present invention contains, as a first component, a metal cation selected from Group II–B and the nonnoble constituents of Group VIII of the Periodic Table (Handbook of Chemistry and Physics, 38 edition, Chemical Rubber Publishing Co.). Particularly preferred metal cations used as the first component in the mixed nonnoble metal catalyst include zinc, cobalt and nickel. The second component of the mixed metal modification of the crystalline aluminosilicate molecular sieve zeolite is a metal or metal compound selected from Groups IV–A, V–B and VI–B of the Periodic Table. Particularly preferred metals in this class are molybdenum and tungsten. Especially preferred embodiments of the catalyst utilized herein include a mixed metal modification of the crystalline aluminosilicate (which has preferably been pretreated with ammonium cations) having the crystal structure of faujasite and a silica-to-alumina mole ratio greater than 3, which ion-exchanged sieve is treated with a Group IV–A, V–B or VI–B metal or metal compound deposited on said sieve by wet impregnation or other processes known to the art. Particularly preferred for use in the present invention are the following metal modifications of a crystalline aluminosilicate molecular sieve zeolite: zinc molybdate faujasite, zinc tungstate faujasite, zinc stannate faujasite, nickel molybdate faujasite, nickel tungstate faujasite, cobalt molybdate faujasite and cobalt tungstate faujasite. Other crystalline aluminosilicate zeolites having a silica-to-alumino mole ratio greater than 3 such as those having the mordenite crystal structure are also desired as molecular sieve bases for the mixed nonnoble metal catalysts used in the present invention.

The most preferred nickel-tungsten hydrogenation component may be introduced into the crystalline aluminosilicate zeolite by any one of several alternative methods. For example, it is possible to employ impregnation techniques previously used in the art to prepare nickel-tungsten or amorphorus base catalysts. These techniques involve treating the catalyst base with solutions containing nickel and tungsten either separately or in combination in a single solution so as to deposit these catalytic materials on the base surface. See in this regard U.S. Pats. Nos. 2,690,433, 3,232,887 and 3,280,040 for descriptions of procedures used in the introducing nickel and tungsten onto various types of catalyst support materials.

It is also possible to prepare the nickel-tungsten catalyst by introducing the nickel into the cation exchange sites of the sodium or more preferably the ammonium form of the crystalline aluminosilicate zeolite. This is accomplished by treating the zeolite with an aqueous solution of an exchangeable nickel salt such as nickel chloride. The resulting nickel exchanged ammonium zeolite is then treated with an ammonium tungstate solution to yield a dispersed nickel-tungsten composite at or near the exchange sites of the ammonium form aluminosilicate zeolite. Upon calcining at elevated temperatures, the ammonium form of the aluminosilicate decomposes to yield a nickel-stungsten on the hydrogen form of the aluminosilicate zeolite.

While the method of preparation of catalysts is not critical to their operability in the hydrocracking process of the present invention, it is believed that the latter procedure utilizing a first exchange step with nickel ion followed by treatment with ammonium tungstate results in catalysts exhibiting superior activity maintenance properties and thus such procedure of preparation would be preferred.

In any event, the preparation procedure should result in a preferred catalyst containing from 2 to 8 weight percent, preferably 3 to 7 weight percent, of the Group II–B or VIII metal, e.g., nickel (based on the metallic form although not necessarily existing as such) and from 5 to 20 weight percent, preferably 6 to 15 weight percent of the Group IV–A, V–B or VI–B metal, e.g., tungsten (based on the metal as above) with the remaining portion comprising the crystalline aluminosilicate zeolite.

The catalysts described above areactivated with gases containing ammonia or an ammonia precursor at temperatures in the range of from about 400° F. to about 800° F., and preferably from about 600° F. to about 750° F., at pressures ranging from atmospheric to the process pressure conditions employed. The contacting gas is preferably a hydrogen-ammonia mixture containing 1 to 30, more preferably 5 to 20, and most preferably 5 to 10, volume percent ammonia. This activating gas mixture is employed at rates ranging from 10 to 1000 gas volumes/volume of catalyst/hour, more preferably at rates ranging from 100 to 500 gas volumes/volume of catalyst/hour with ammonia concentration in the preferred ranges disclosed above. The time for this activation ranges from 1 to 24 hours, more preferably from 3 to 12 hours. In place of ammonia, nitrogen precursor compounds which will decompose to yield ammonia can be used. Examples of such materials are the aliphatic and aromatic amines such as butyl amine, aniline, and the like. Also, when hydrogen is used as the carrier gas, nitriles such as acrylonitrile may be employed as the ammonia precursor activating agent. Other carrier gases include light paraffinic hydrocarbons, e.g., methane, ethane, propane, and the like. Also, normally inert gases such as nitrogen, helium, and the like may be employed as the carrier gases.

The invention will be better understood by reference to the following examples, which are not intended to be limiting.

EXAMPLE 1

Preparation of catalysts used in the present invention

A crystalline aluminosilicate zeolite catalyst of the synthetic faujasite variety containing zinc and tungsten was prepared by the following procedure:

A zinc faujasite was reacted with an ammoniacal solution of tungstic acid. The intermediate zinc faujasite was prepared by three-fold zinc ion exchange of sodium faujasite in multiple batches. In each preparation, 500 grams of a commercial sodium faujasite was suspended in 2000 grams of water and a solution of one pound of zinc chloride in 500 cc. of water was added at room temperature, with continued agitation for 4 hours. Thereupon, the treating liquid was removed by filtration and the filter cake was washed three times each by suspension in 2500 cc. of water and agitation for 1 hour. The wash water was removed in each instance by filtration. The product from the third wash was suspended in 2000 grams of water and again was treated with a solution of 1 lb. of zinc chloride in 500 cc. of water for 4 hours at room temperature. Again the treating solution was removed by filtration and the filter cake was washed three times each by suspension in 2500 cc. of water for 1 hour followed by filtration. The washed cake was exchanged a third time with fresh zinc chloride solution as in the first and second exchanges. Following the three-fold water wash, multiple batches were composited and dried for use in further steps of the preparation as follows:

A charge of 100 grams of tungstic acid ($WO_3$) was dissolved in 1000 grams of concentrated ammonium hydroxide first by stirring for 2 hours at 150° F. and then by evaporation to about 500 cc. at temperatures up to 200° F. while stirring. Thereupon, water was added to bring the total solution to 3 liters and the solution was transferred at a temperature of 150° F. to a 5-liter container. To this solution 500 grams of the zinc faujasite described above was added and agitation was continued at 150° F. for 24 hours. The treating solution was removed by filtration and the filter cake was dried without further water washing for use.

The above-prepared zinc-tungsten faujasite catalyst was heated to 300° F. in a stream of nitrogen and maintained at this temperature for about 65 hours, whereupon the temperature was raised to 450° F. and the catalyst was treated with a 95%–5% hydrogen-ammonia mixture at atmospheric pressure. The temperature was raised to 850° F. over a 6-hour period, during which period 26.75 cubic feet of the mixed hydrogen-ammonia gas had been passed over the catalyst. Thereupon the gas rate was reduced and the flow was maintained at atmospheric pressure overnight. The entire treatment with the mixed hydrogen-ammonia stream amounted to 48.3 cubic feet of gas. This corresponds to an average gas rate of 380 v./v./hr. The system was then pressurized with the hydrogen/$NH_3$ gas at 2000 p.s.i.g and finally brought to operating pressure of 2500 p.s.i.g. with hydrogen. At this point the temperature was decreased from 850 to 800° F. and a shale oil feed containing 2.1 weight percent nitrogen and having a gravity of 17.4° API was introduced at a space velocity of 1 v./v./hr., temperature of 817° F., pressure of 2500 p.s.i.g., and an exit hydrogen rate of about 4500 s.c.f./b. Under these conditions the shale oil was hydrocracked to the extent of about 75% to lower boiling products and the API gravity increased from 17.4° to 39.5°. The product was then fractionated into various portions as shown in the following table:

TABLE II.—HYDROCRACKING OF SHALE OIL FEED WITH AMMONIA-ACTIVATED CRYSTALLINE ZEOLITE CATALYST

[Pressure, 2,500 p.s.i.g.; space velocity, 1 v./v./hr.; temperature, 817° F.; $H_2$ rate, 4,500 s.c.f./bbl.]

| | Shale | Hydrocrackate[1] | | | | |
|---|---|---|---|---|---|---|
| Fraction | oil feed | $C_5$– 180° F. | 180– 375° F. | 375– 430° F. | 430– 650° F. | 650+ btms. |
| Vol. percent, yield[2] | 100 | 15.6 | 24.4 | 8.6 | 23.1 | 29.5 |
| Gravity, ° API | 17.4 | 82 | 53.4 | 38.6 | 31.7 | 18.4 |
| Nitrogen, wt. percent | 2.1 | 0.005 | 0.043 | 0.207 | 0.347 | 1.47 |

[1] $C_3$-gas, 4.4 wt. percent.
[2] Yield ex. $HN_3$, $H_2S$ and $H_2O$.

As shown in the above table, a remarkable degree of hydrocracking and nitrogen removal by the process of the invention was obtained. The nitrogen content was decreased to extremely low levels with concurrent hydrocracking of feed.

EXAMPLE 2

Experiments were conducted to demonstrate that good conversion and excellent nitrogen removal are effected at increased gas rates in the hydrocracking of shale oil with an ammonia activated zinc tungsten faujasite composition. On a once-through basis, the increased gas rate has the effect of reducing the hydrogen sulfide partial pressure and of stripping occluded hydrogen sulfide from the catalyst. Results of experiments at varying conditions using the catalyst of Example 1 are summarized in the following table:

TABLE III.—HYDROCRACKING OF SHALE OIL FEED WITH AMMONIA-ACTIVATED CRYSTALLINE ZEOLITE CATALYST AT HIGH GAS RATES

| | | | | | |
|---|---|---|---|---|---|
| Process conditions: | | | | | |
| Temperature, ° F | | 805 | 817 | 862 | 872 |
| V./v./hr | | 0.5 | 1.0 | 1.0 | 1.0 |
| Pressure | | 2,450 | 2,450 | 2,450 | 2,450 |
| $H_2$. s.c.f./bbl | | 9,000 | 4,500 | 20,000 | 20,000 |
| | Feed | $NH_3$-ZnW-faujasite | | | |
| Inspection of liquid products: | | | | | |
| Gravity, ° API | 17.4 | 50.5 | 39.5 | 54.6 | 66.8 |
| Nitrogen, wt. percent | 2.1 | 0.29 | 0.57 | 0.19 | 0.022 |
| Percent nitrogen removal | | | 73 | | |
| Product distribution: | | | | | |
| $C_3$ and L, wt. percent | | 11.9 | 4.4 | 16.6 | 21.9 |
| $C_4$–430° F., vol. percent | 5.0 | 86.5 | 59.9 | 97.3 | |
| 430° F.+, vol. percent | 95 | 25.4 | 52.6 | 14.0 | |
| Percent naphtha increase | | | 54.9 | 92.3 | |
| Nitrogen content: $C_5$–430° F. naphtha, wt. percent | | | 0.02 | 0.05 | 0.03 |

In the first two columns of the above table, it is shown that, while the feed rate and temperature variables tend to compensate for each other, the yield of $C_4$–430° F. product is greatly enhanced at the two-fold gas rate, i.e., 9000 vs. 4500 s.c.f./bbl. The respective yields are 86.5 and 59.9 volume percent, based on feed. Likewise, the nitrogen content of the liquid product is reduced from 0.57 to 0.29%, and in the corresponding naphtha fractions the nitrogen content is reduced from about 0.05% to about 0.02%. At the higher gas rate of 20,000 s.c.f./bbl. and a higher temperature (862° vs. 817° F.), the hydrocracking and hydrodenitrogenation is even more pronounced but the nitrogen content of the naphtha remains about the same.

It has been concluded, as earlier suggested, that the step of treating an ammonium zeolite base, with ammonia, e.g., as disclosed in U.S. 3,404,086 of Plank et al., does not produce a catalyst at all suitable for the processing of high nitrogen content feeds. The ammonia-treated ammonium zeolite base in the presence of nitrogen is rapidly deactivated, even at temperature conditions considerably milder than disclosed by the Plank et al. patent and, in fact, in a time measured in terms of only a fraction of one day the said ammonia-treated zeolite base has little more activity than can be attributed to thermal effects.

Demonstration

To support these conclusions the following experimental data are offered by way of demonstration:

One hundred grams of ammonium exchanged crystalline aluminosilicate zeolite, of high quality, was charged into a reactor at ambient temperature. Hydrogen was introduced into said reactor, and the temperature of the reactor was slowly raised to 300° F. and held for one-half hour. The temperature was then raised 100° F. every one-half hour until a temperature of 700° F. was reached. The flow of hydrogen was then cut off and anhydrous ammonia was fed into the reactor and the temperature elevated further, at the same rate, until reaching 1250° F. This temperature was maintained for a period of sixteen hours. During this period a total of 2.2 cubic feet of anhydrous ammonia was flowed over the catalyst.

The anhydrous ammonia flow was then stopped, and a flow of hydrogen substituted for the ammonia. The flow was maintained, and the temperature permitted to gradually drop to 817° F., at which time a shale oil feedstock similar to that employed in Example 1 of applicants' application, except that it was an 85 percent overhead fraction taken from the total shale oil. The run was continued for a period of four hours, after which time the product was analyzed. A similar run was also made, for comparative purposes, using inert ceramic beads in the reactor in lieu of zeolite.

The results of these runs are tabulated below:

TABLE IV.—HYDROCRACKING OF SHALE OIL FEED WITH AMMONIA-ACTIVATED CRYSTALLINE ZEOLITE CATALYST AT HIGH GAS RATES

| Process conditions: | | | |
|---|---|---|---|
| Temperature, ° F | | 817 | |
| V./v./hr | | 1.0 | |
| Pressure | | 2,400 | |
| $H_2$, s.c.f./bbl | | 4,500 | |
| | Feed | H-faujasite $NH_3$ treated | No catalyst (ceramic beads) |
| nspection of liquid product: | | | |
| Gravity, ° API | 22.0 | 25.6 | 24.81 |
| $N_2$, wt. percent | 2.27 | 1.63 | 2.51 |
| Percent $N_2$ removal | | 28 | |
| Product distribution: | | | |
| $C_3$ and L, wt. percent | 0 | 1.2 | 0.3 |
| $C_4$–430° F., vol. percent | 12.4 | 20.6 | 13.2 |
| 430° F.+, vol percent | 87.6 | 78.2 | 86.5 |
| Δ naphtha increase, percent | | 8.2 | 0.8 |

From the foregoing data, obtained at the end of a four-hour run, it will be observed that the catalytic activity was only a little higher than obtained with inert ceramic beads, which have no catalytic activity. In other words, the results show that the catalytic activity of the ammonia-treated hydrogen faujasite is little more effective than can be attributed to ordinary thermal effects alone.

Based on temperature observations, made with thermocouples within the catalyst bed, it was found that the activity of the ammonium treated hydrogen faujasite catalyst appeared to decline quite rapidly after the first hour of operation, and for the remaining period of time this temperature profile was essentially the same as that observed for the ceramic bead run. At this rate of deactivation, it is apparent that the catalyst would possess no significant catalytic activity by the end of a twenty-four hour period.

EXAMPLE 3

This example will demonstrate the superiority of the ammonia-activated zinc tungsten faujasite composition over sulfur-activated non-zeolite conventional catalyst. The data presented in Examples 1 and 2 were compared with similar results obtained from a commercial cobalt molybdate-alumina catalyst prepared for hydrocracking and hydrofining high nitrogen feeds. This commercial cobalt molybdate-alumina catalyst was activated with a 90% hydrogen-10% hydrogen sulfide mixture at 850° F. according to conventional procedures. The catalyst performances are compared in the following table:

TABLE V.—COMPARISON OF AMMONIA-ACTIVATED ZINC TUNGSTEN FAUJASITE WITH SULFUR-ACTIVATED NON-ZEOLITE CATALYST IN HYDROCRACKING OF SHALE OIL

| Catalyst | Zn W faujasite [1] | | $CoMoO_4$-$Al_2O_3$ [2] |
|---|---|---|---|
| Process conditions: | | | |
| Temperature, ° F | 845 | 862 | 900 |
| Pressure, p.s.i.g | 2,450 | 2,450 | 3,000 |
| V./v./hr | 0.5 | 1 | 1 |
| Hydrogen rate, s.c.f./bbl | 9,000 | 20,000 | 6,000 |
| Product distribution: | | | |
| $C_3$ and L, wt. percent | 11.9 | 16.6 | 15.9 |
| $C_4$–430° F., vol. percent | 86.5 | 97.3 | 74.2 |
| 430° F.+, vol. percent | 25.4 | 14.0 | |

[1] Catalyst pretreated with $H_2/NH_3$ at 850° F.
[2] Catalyst pretreated with $H_2/H_2S$.

The superiority of the ammonia-activated zinc tungsten faujasite is readily apparent. At temperatures of some 40–100° F. lower and at a somewhat lower pressure, the ammonia-activated zeolite provides higher naphtha yields and smaller yields to gas on a conversion basis.

EXAMPLE 4

This example compares the performance of a crystalline zeolite containing Group VIII metal added as a cation and Group VI metal added as an anion using conventional sulfur activation versus ammonia activation of the invention. The catalyst was prepared by intimtely mixing sodium faujasite and a silica alumina cracking catalyst in 80:20 weight ratio. The composite was exchanged one time with ammonium nitrate solution which reduced the soda content ($Na_2O$) on the total composition to 3.4%. The product was dried, pilled and steamed for 4 hours at 1100° F. The resultant material was exchanged with nickel nitrate solution so as to incorporate 1.5% nickel. This nickel containing zeolite was then treated with ammonium paratungstate solution, solubilized with 2 mols methyl ethyl amine, so as to yield a composition analyzing 10.3 wt. percent tungsten. The catalyst was calcined for 16 hours at 1000° F. and one portion was activated in the conventional manner by heating at 650° F. for 16 hours in a stream of hydrogen-hydrogen sulfide in a 90:10 volume ratio. Another portion of the calcined catalyst was activated by heating to 650° F. for 16 hours in a flow of 90:10 volume ratio hydrogen-ammonia mixture.

The catalysts so prepared and activated were tested side by side in a common sand bath heater for hydrocracking activity with a light catalytic cycle oil purposely contaminated with (1) nitrogen to the extent of 1000 p.p.m. by the addition of n-butyl amine, and (2) sulfur to the extent of 3000 p.p.m. by the addition of thiophene. The preponderance of sulfur tends to favor the sulfur-activated catalyst and to place the ammonia-activated catalyst at a disadvantage. The catalysts were evaluated for hydrocracking performance by the amount of 400° F. and lighter material obtained in a standard ASTM distillation of the condensed product from the hydrocracking tests. The results of this test are summarized in the following table:

TABLE VI.—HYDROCRACKING OF LIGHT CATALYTIC CYCLE OIL (NITROGEN AND SULFUR CONTAMINATED) WITH CRYSTALLINE NICKEL TUNGSTEN FAUJASITE CATALYSTS

[Pressure, 1,000 p.s.i.g.; space velocity, 1 v./v./hr.; temperature, 730° F.; $H_2$ rate, 5,000 s.c.f./bbl.]

| Catalyst activation | Hydrogen sulfide | | Ammonia | |
|---|---|---|---|---|
| Hours on stream | 24 | 100–124 | 24 | 100–124 |
| Conversion, 400° F. and L, vol. percent | 84 | 80 | 88 | 87 |
| Gravity liquid product, ° API | 60.2 | 58.3 | 61.0 | 60.4 |

Although at a disadvantage because of the high sulfur content of the feed, the ammonia-activated catalyst per-formed somewhat better than the catalyst activated by conventional techniques. It is observed that this was accomplished without fortification of the gas with ammonia to achieve the desired $NH_3/H_2S$ ratio in the treating gases.

EXAMPLE 5

The testing of the catalysts described in Example 4 was continued in the side-by-side reactors in a common sand bath heater using a refractory gas oil feed containing 900 p.p.m. nitrogen and 17,300 p.p.m. sulfur. As in the previous example, the ammonia-activated catalyst was not used to the best advantage because of the predominance of sulfur over nitrogen resulting in an unfavorable ratio of $NH_3/H_2S$ in the treating hydrogen. The zeolite catalyst activated by two techniques is evaluated for hydrocracking, hydrodenitrogenation, and hydrodesulfurization activities. These performances are compared in the following table:

TABLE VII.—HYDROCRACKING, HYDRODENITROGENATION AND HYDRODESULFURIZATION OF A WEST COAST GAS OIL (NICKEL-TUNGSTEN FAUJASITE CATALYST)

[Pressure, 1,000 p.s.i.g.: space velocity, 1 v./v./hr.; temperature, 730° F.; 4,000–5,000 s.c.f. $H_2$/bbl. feed]

| | | Catalyst activation | | | |
|---|---|---|---|---|---|
| | Feed | Hydrogen sulfide | | Ammonia | |
| Catalyst age, hours on | | 130 | 200 | 130 | 200 |
| Liquid product: | | | | | |
| Gravity, ° API | | 41.7 | 39.8 | 44.5 | 39.6 |
| Refractive index, $n_D^{20}$ | 1.5164 | 1.4636 | 1.4713 | 1.4576 | 1.4737 |
| Conversion, (D+L) to 400° F | | 44 | 29 | 60 | 44 |
| Nitrogen, p.p.m | 900 | 1 | 3 | 1 | 3 |
| Sulfur, p.p.m | 17,300 | 31 | 279 | 550 | 480 |

At comparable periods of operation (Columns 1 and 3; 2 and 4), the ammonia-activated catalyst gave more hydrocracking than the sulfur-activated catalyst. The two gave essentially complete nitrogen removal and a remarkably high sulfur removal. The ammonia-activated catalyst, although designed for predominantly nitrogen feeds, is only slightly inferior to the sulfur-activated catalyst for hydrodesulfurization. At comparable conversion of 44% (Columns 1 and 4), the refractive index data indicate a somewhat more aromatic product for the ammonia-activated catalyst.

EXAMPLE 6

This example illustrates the beneficial effects of using the crystalline zeolite base. A first catalyst was prepared from a zinc sodalite, obtained by exchanging synthetic sodalite with zinc ions, and ammonia tungstate solution analogous to the preparation of Example 1. The resulting composition was essentially amorphous. A second catalyst was a zinc tungsten-alumina composition and was obtained by impregnation of alumina catalyst base with zinc salt and treatment of the impregnate with ammonia tungstate solution, as disclosed in Example 1. The zinc tungsten silica alumina (from sodalite) and the zinc tungsten-alumina catalyst, after ammonia activation, were tested for shale oil denitrogenation and the results are compared with the data of Example 1 in the following tabulation:

TABLE VIII.—DENITROGENATION OF SHALE OIL WITH ZINC TUNGSTEN COMPOSITIONS ACTIVATED WITH AMMONIA

[Pressure, 2,450 p.s.i.g.; space velocity, 1 v./v./hr.; 4,000–5,000 s.c.f. $H_2$/bbl. feed]

| | Catalyst configuration | | | |
|---|---|---|---|---|
| | Crystalline | Amorphous | | Amorphous |
| Catalyst base material | Faujasite | Sodalite | | Alumina |
| Temperature, ° F | 817 | 800 | 860 | 810 |
| Conversion to $C_3$ and lighter, wt. percent | 3–4 | 3–4 | 3–4 | 3–4 |
| Nitrogen removed, wt. percent | 73 | 16 | 51 | 40 |

The more effective denitrogenation with the crystalline faujasite composition is thus demonstrated.

The following example is intended to show a procedure for the preparation of the novel catalysts of this invention.

EXAMPLE 7

Runs were made wherein portions of zeolite-Y were first exchanged with salts of metals to obtain zeolite structures within which is incorporated the following metals: nickel, cobalt, zinc, manganese, palladium, tin. The degree of metal exchange provided from about 4–8 weight percent metal, calculated as metallic metal. To certain of these exchanged catalyst bases molybdenum or tungsten was added as a second hydrogenation component. The molybdenum and tungsten were added at a level of 10 weight percent, by impregnation. Catalyst G was physically modified by steaming to obtain unit cell size shrinkage prior to nickel exchange and addition of tungsten to the catalyst, as hydrogenation components.

All catalysts were calcined at 1000° F., as is the standard prior art procedure for activation of zeolite catalyst. Analysis of these calcined materials demonstrates that low levels of ammonia were present after calcination. The catalysts were also treated with excess ammonia gas at 700° F., pursuant to this invention, to bring about catalyst activation prior to process activation. The ammonia concentration is given in comparison with the calcined catalyst data to demonstrate the compositions of the ammonia-metal complex zeolite catalyst.

These data, inclusive of cell size measurements, are tabulated below:

| Catalyst | | Pretreat | Unit cell size | Per. cent $NH_3$ |
|---|---|---|---|---|
| A | NiMo-Y | Calcined at 1,000° F | 24.61 | 0.07 |
| | | $NH_3$ treated at 700° F | | 3.63 |
| B | CoW-Y | Calcined at 1,000° F | 24.62 | 0.02 |
| | | $NH_3$ treated at 700° F | | 3.14 |
| C | PdMn-Y | Calcined at 1,000° F | | 0.02 |
| | | $NH_3$ treated at 700° F | | 2.09 |
| D | ZnW-Y | Calcined at 1,000° F | 24.60 | 0.03 |
| | | $NH_3$ treated at 700° F | | 9.27 |
| E | ZnSn-Y | Calcined at 1,000° F | | 0.02 |
| | | $NH_3$ treated at 700° F | | 6.99 |
| F | NiW-Y | Calcined at 1,000° F | 24.65 | 0.74 |
| | | $NH_3$ treated at 700° F | 24.65 | 3.02 |
| G | NiW-on steamed H-Y base (SK-40). | Calcined at 1,000° F | 24.46 | 0.03 |
| | | $NH_3$ treated at 700° F | 24.46 | 2.42 |

From these data it is concluded as follows: The catalysts of this invention, after activation, contain from about 2 to 10 weight percent ammonia, depending upon the nature of the metal cation employed in producing these catalysts and upon metal concentration. It is noticeable that zinc containing catalyst contains three-fold greater quantities of nitrogen than the other catalysts. This is believed due to the unique properties of zinc and its ability to complex with greater quantities of ammonia. It was further observed that the greater the concentration of exchanged metal the greater the amount of nitrogen, as ammonia, which complexes with the catalyst. All catalysts not starting with the ammonium ion exchange percursor show no cell size change after catalyst pretreatment. Catalyst G, steamed previous to the addition of the hydrogenation component, shows considerable cell size change when contrasted with the other catalysts.

From the foregoing it is apparent that the presence of the exchanged or deposited metals is necessary to form the complex. To show that the conventional technique of ammonium ion exchanging zeolites does nothing more than add ammonium ions to the structure, with subsequent loss of ammonia on heating to produce a hydrogen form of zeolite, the following demonstration was made.

Sodium faujasite zeolite, and another specimen as identified below, was exchanged with an aqueous solution of ammonium chloride to displace 82 percent of the original sodium with ammonium ions. The ammonium zeolite was then dried at ambient conditions and then heat-treated according to the schedule described. Results as follows:

DEMONSTRATION

| Catalyst | Temperature of treatment, ° F. | Wt. percent available ammonia |
|---|---|---|
| $NH_4$-Y (82% Na-Exchanged) | Ambient | 7.7 |
| | 842 | 0.57 |
| | 932 | 0.36 |
| | 1,292 | 0.07 |
| Base of $NH_4$-exchanged SK-40 for Catalyst G, from Example VII | 1,000 | 0.03 |

To show the criticality of the temperature of the ammonia activation of the said catalyst comprising a zeolite as a hydrocracking catalyst, physical inspections of the so-treated catalyst were then obtained by X-ray diffraction method.

In obtaining the X-ray powder diffraction pattern, standard procedures were employed. The radiation source was the K-alpha doublet for copper. A Geiger counter spectrometer with a strip chart pen recorder was used in recording the data. The peak heights, I, and the positions as a function of $2\theta$, where $\theta$—the Bragg angle, were read from the spectrometer chart. From these, the relative intensities I were observed. Also, the interplanar spacing *d*, in Angstrom units, corresponding to the recorded lines, were determined by reference to standard tables.

These inspections, stated in conventional terms, were compared with X-ray diffraction patterns of untreated catalyst. The results are given below:

| Intensity, *d*(A.) [1] | Ammonia treated at 1,250° F. for 16 hrs. | Untreated catalyst |
|---|---|---|
| 44.29 | 46 | Nil. |
| 51.65 | 24 | Nil. |

[1] Massive agglomerates of metal are easily detected by X-ray diffraction. X-ray diffraction cannot detect metal crystal structure less than 50 A.

Evaluation of the X-ray diffraction pattern thus shows that the exchanged nickel has migrated and agglomerated outside the zeolite structure as reduced nickel. Agglomeration of the desired hydrogenation component reduces the effectiveness of the catalyst for hydrocracking.

Having described the invention, what is claimed is:

1. A process for upgrading a high boiling, nitrogen-containing feedstock which comprises contacting said feedstock, which contains at least about 2500 p.p.m. of nitrogen, in the presence of $H_2$ and hydrocracking same at elevated temperature and pressure with a catalyst, previously prepared prior to contact with the feedstock by activation of a crystalline zeolite base containing a mixture of non-noble metal hydrogenation components by treatment with ammonia at temperatures ranging from about 400° F. to about 800° F.

2. The process of claim 1 wherein said zeolite catalyst is activated with ammonia at a temperature ranging from about 600° F. to about 750° F.

3. The process of claim 1 wherein the ammonia is applied as a hydrogen-ammonia mixture containing 1 to 30 volume percent ammonia.

4. The process of claim 3 wherein the ammonia concentration of the mixture ranges from about 5 to 20 volume percent ammonia.

5. The process of claim 3 wherein the activating gas mixture is employed at rates ranging from about 10 to 1000 gas volumes, per volume of catalyst per hour, at times ranging from 1 to 24 hours.

6. The process of claim 1 wherein said feedstock is shale oil.

7. The process of claim 1 wherein said feedstock contains up to about 25,000 p.p.m. nitrogen.

8. The feedstock of claim 1 where at least about 70 volume percent of the hydrocarbon constituents have boiling points of at least 400° F.

9. The process of claim 1 wherein the feedstock is processed at the following conditions:

| | |
|---|---|
| Temperature, ° F. | 600–900 |
| Pressure, p.s.i.g. | 500–3000 |
| Feed rate, v./v./hr. | 0.5–5.0 |
| $H_2$ rate, s.c.f./bbl. | 2000–20,000 |

10. The process of claim 9 wherein the overall conversion of the feed to lower-boiling products ranges from about 20 to about 100 volume percent.

11. The process of claim 10 wherein the conversion of the feed to $C_3$ products is limited to less than about 15 weight percent, based on feed.

12. The process of claim 1 wherein said zeolite has uniform pores between about 6 to 15 angstrom units and a silica-to-alumina molar ratio above about three.

13. The process of claim 1 wherein said zeolite is synthetic faujasite.

14. The process of claim 1 wherein said zeolite contains a member of the class consisting of Group II–B metals and nonnoble metals of Group VIII and a member of the class consisting of metals in Groups IV–A, V–B and VI–B.

15. The process of claim 1 wherein said zeolite contains a mixture of nonnoble metals comprising nickel and tungsten.

16. The process of claim 14 wherein the Group II–B metals and nonnoble metals of Group VIII are dispersed on the zeolite in concentration ranging from about 2 to 8 weight percent, and the Group IV–A, V–B and VI–B metal is deposited in concentration ranging from about 5 to 20 weight percent.

17. The process of claim 14 wherein the catalyst comprises a faujasite containing bimetallic compounds selected from the group consisting of zinc molybdate, zinc tungstate, zinc stannate, nickel molybdate, nickel tungstate, cobalt molybdate, and cobalt tungstate.

18. The process of claim 17 wherein the nickel-tungsten zeolite catalyst is formed by introduction of nickel into the cation exchange sites, and the resulting nickel-exchanged zeolite subsequently treated with an ammonium-tungstate solution to yield a dispersed nickel-tungsten composite at or near the ion exchange sites.

19. A process for upgrading a high boiling, nitrogen-containing feedstock which comprises contacting said feedstock, which contains at least about 2500 p.p.m. of nitrogen, in the presence of $H_2$, and hydrocracking same at elevated temperature and pressure in the presence of a catalyst prepared by activation of a composite comprising a crystalline alumino-silicate zeolite base and a mixture of non-noble metal hydrogenation components at temperatures ranging from about 400° F. to about 800° F., pressures ranging from atmospheric to 3000 p.s.i.g., for periods ranging from 1 to 24 hours, with ammonia, which catalyst composite after the ammonia treatment contains at least 1.5 weight percent nitrogen, calculated as ammonia, based on the weight of the total composite.

20. The process of claim 19 wherein said crystalline aluminosilicate base or the composite contains a member of the class consisting of Group II–B metals and nonnoble metals of Group VIII and a member of the class consisting of metals in Groups IV–A, V–B, and VI–B.

21. The process of claim 19 wherein a hydrogen-ammonia gas mixture is employed at rates ranging from about 10 to 1000 gas volumes, per volume of catalyst per hour.

22. The process of claim 19 wherein said feedstock is shale oil.

23. The process of claim 22 wherein said feedstock contains up to about 25,000 p.p.m. nitrogen.

24. The process of claim 19 wherein the feedstock is processed at the following conditions:

| | |
|---|---|
| Temperature, ° F. | 600–900 |
| Pressure, p.s.i.g. | 500–3000 |
| Feed rate, v.v./hr. | 0.5–5.0 |
| $H_2$ rate, s.c.f./bbl. | 2000–20,000 |

25. The process of claim 19 wherein the catalyst composite comprises from 2.5 to 10 percent nitrogen.

26. The process of claim 19 wherein the catalyst composite comprises faujasite having a silica-to-alumina ratio greater than about 3.

References Cited

UNITED STATES PATENTS

| | | | |
|---|---|---|---|
| 3,269,934 | 8/1966 | Hansford | 208—111 |
| 3,404,086 | 10/1968 | Plank et al. | 208—120 |
| 3,404,085 | 10/1968 | Hamner et al. | 208—111 |
| 3,213,012 | 10/1965 | Kline et al. | 208—110 |
| 3,644,200 | 2/1972 | Young | 208—120 |
| 3,437,587 | 4/1969 | Ellert et al. | 208—120 |
| 3,523,887 | 8/1970 | Hanson et al. | 208—111 |

OTHER REFERENCES

Kerr & Shipman: "The Reaction of Hydrogen Zeolite Y With Ammonia at Elevated Temps.," J. Phys. Chem. 72 (8), 3071–2 (August 1968).

DELBERT E. GANTZ, Primary Examiner

G. E. SCHMITKONS, Assistant Examiner

U.S. Cl. X.R.

208—DIG 2, 120, 138, 254 H; 252—438, 455 Z